Nov. 25, 1958  W. C. MOORE  2,862,178

TEST INSTRUMENT CALIBRATING APPARATUS

Filed Feb. 10, 1956

INVENTOR.
W. CULLEN MOORE

BY
Campbell, Brumbaugh, Free & Graves
his ATTORNEYS.

United States Patent Office 2,862,178
Patented Nov. 25, 1958

2,862,178

TEST INSTRUMENT CALIBRATING APPARATUS

William Cullen Moore, Mountain Lakes, N. J., assignor to Boonton Radio Corporation, Township of Parsippany-Troy Hills, N. J., a corporation of New Jersey Application February 10, 1956, Serial No. 564,671

8 Claims. (Cl. 324—34)

This invention relates to apparatus used with instruments requiring separate calibration for various tests and, more particularly, to a film thickness gauge in which a plurality of standards may be selectively incorporated.

Test instruments performing a variety of similar tests on various materials must often be separately calibrated for each set of tests. In the past this usually involved relating meter readings to inconvenient reference charts which were difficult to interpret quickly and accurately.

For example, in measuring the thickness of thin films on basis materials, it is necessary to urge a probe excited by high frequency energy against a basis material to set the instrument at a zero or null reading. Subsequently, the probe must be placed against one or more standard films on the basis material so that a sensitivity control may be suitably adjusted to calibrate the instrument for use on articles plated with the standard material. It will be evident that the necessity for carrying the various basis material and film samples in addition to the requirement of correlating instrument readings with indicia associated with the samples made instrument calibration a cumbersome procedure at best.

To overcome the above difficulties and provide calibrating arrangements for test instruments and, in particular, for a thickness measuring instrument such as disclosed in copending application Serial No. 566,155, filed February 17, 1956, by Ants T. Pip for "Induced Current Testing Apparatus," a removable card carrying suitable standards is utilized with the instrument. The card slides into a holder and is juxtaposed with a meter on the instrument. Suitable indicia extend from the various standards on the card directly to its edge which is positioned and marked as a scale for the meter pointer. By urging a probe against the standards and adjusting controls on the instrument, it may be quickly and accurately calibrated for desired basis and film metals.

These and further advantages of the present invention will be more readily understood when the following description is read in connection with the accompanying drawings in which.

Figure 1:
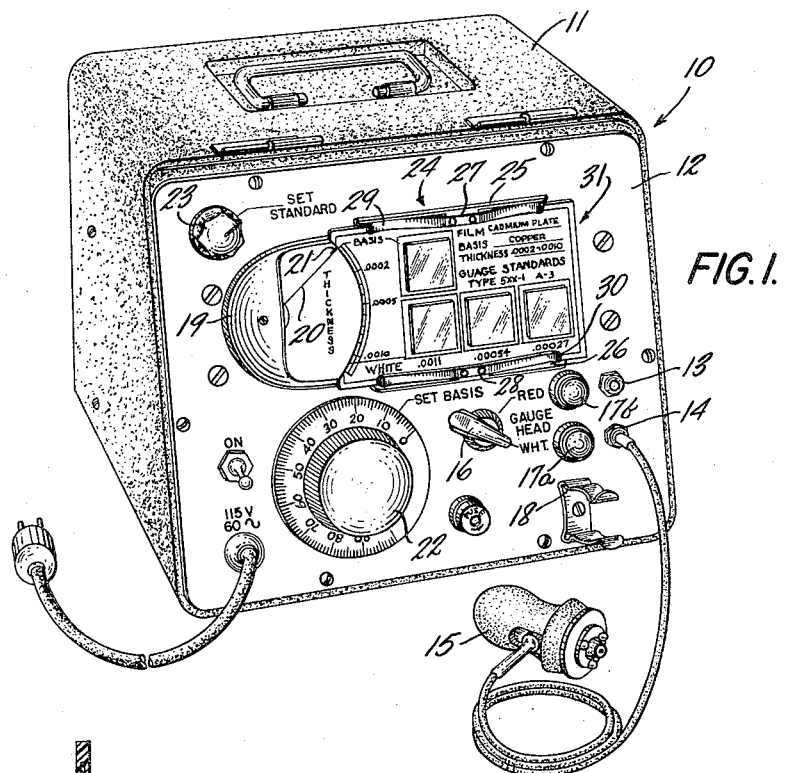
Figure 1 is a perspective view of a film thickness gauge embodying the principles of the present invention.

Referring to a typical embodiment of the invention in greater detail with particular reference to Figure 1, a metal film gauge 10 comprises a case 11 on which is mounted a sloping front panel 12. Jacks 13 and 14 selectively receive connectors joined to probes 15, one of which is shown, adapted to be urged against metal surfaces to be tested.

The probe 15 includes at its tip a coil energized by high frequency currents to induce eddy currents in a tested article. The impedance reflected from the tested article detunes the coil in the probe 15, this phenomenon being measured by suitable circuitry in the instrument 10 as fully described in the above mentioned copending application.

The probes 15 are energized at two frequencies by selectively moving a switch 16 to a white or a red position which energizes the appropriate indicator light 17a or 17b. A clip 18 is provided to hold one of the probes 15, the other of the probes being stored in a cover (not shown) enclosing the panel 12.

A meter 19 on the panel 12 includes a pointer 20 but does not incorporate any fixed indicia other than a meter zero indicia line 21. With the probe urged against a basis material, rotation of a knob 22 tunes the probe 15 to resonance which is indicated when the pointer 20 is positioned directly on the indicia 21. Rotation of a further knob 23 varies the position of the pointer 20 when the probe 15 is urged against a metal surface to calibrate the instrument 10 for a particular film and basis metal combination.

Figures 2, 3:
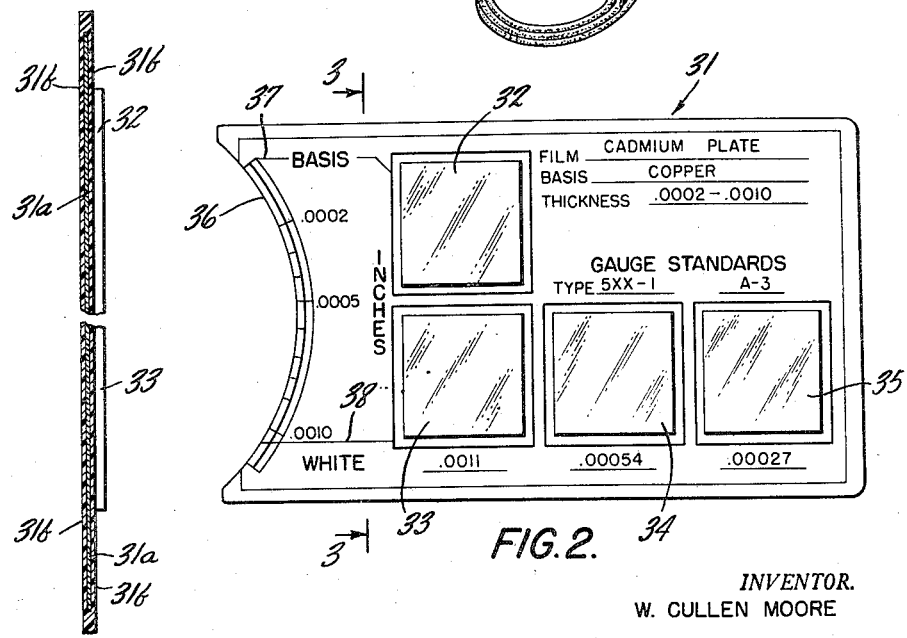
Figure 2 is a plan view of a sample card usable with the instrument of Figure 1.
Figure 3 is a transverse section, somewhat enlarged, of the card of Figure 2 taken along the view line 3—3 looking in the direction of the arrows.

A card holding frame 24 may be formed of a flat plate fastened to the panel 12 and having angled flanges 25 and 26 along its sides. Tabs 27 and 28 respectively extend from flanges 25 and 26 to support spring fingers 29 and 30, biased against the bottom plate of the frame 24. A calibration card 31, best shown in Figures 2 and 3, is slidably received by the frame 24 and held in position by the spring fingers 29 and 30.

Referring to the card 31 in greater detail, it may be laminated of a cardboard layer 31a encased by transparent plastic layers 31b. The layer 31a is provided with four outlined rectangular spaces, for example, indicating the position of a basis standard 32 and film thickness standards 33, 34 and 35 mounted on one of the plastic layers 31b. Information as to the composition of the basis and film materials and the thickness of each of the standard films is also found on the card. Of course, the card 31 may be formed of other suitable materials such as white fiberboard.

An edge 36 of the card 31 is curved to fit one edge of the meter 19, suitable indicia being disposed along the edge 36 to form a scale cooperating with the pointer 20. Thus, an indicia line 37 extending from the basis standard 32 terminates at the upper end of the scale 36, this being the null or zero position of the pointer 20. Towards the lower full scale end of the edge 36 another indicia line 38 extends from the standard sample 33 and terminates at an appropriate point. Several points along the scale 36 are suitably marked with indicia, the film standards 34 and 35 falling within this range and providing a close check on the accuracy of calibration of the instrument 10 over the entire scale 36.

It will be noted that the card 31 is used for a copper basis material coated with a cadmium film. When calibrated with this card 31, the instrument 10 may be used to measure cadmium film to a thickness of of about 1.1 mils on any copper base. In order to calibrate the instrument 10 accurately using the card 31, the probe 15 is urged against the basis standard 32 and the knob 22 rotated until the pointer 20 coincides with the indicia line 21 on the meter 19. Subsequently, the probe 15 is urged against the standard 33, the set standard knob 23 being rotated to place the pointer 20 exactly opposite the indicia line 38 at the lower end of the scale 36. The instrument 10 is now calibrated and may be utilized to test the thickness of a cadmium film which has been plated or otherwise coated on a copper base.

When it is necessary to use the film thickness gauge 10 for another application, the card 31 may be slipped out of the frame 24 and a similar card inserted therein on which different bases and film standards are provided The instrument 10 may then be calibrated in the above discussed manner and utilized to test appropriate articles.

It will be apparent that the present invention provides simple calibrating elements for instruments such as the thickness gauge described above. Of course, the calibrating apparatus may be applied to other similar instruments in which frequent calibration is required, the invention not being limited to film thickness gauges. Therefore, it will be understood that the above described embodiment of the invention is illustrative only and modifications thereof will occur to those skilled in the art. Therefore, the invention is not to be limited to the specific apparatus disclosed herein but is to be defined by the appended claims.

I claim:

1. Calibration apparatus for a probe carrying instrument incorporating a meter deflected in accordance with indicating signals representative of a characteristic being tested by the probe comprising an indicia carrying card including a scale on one edge, means for removably juxtaposing the one card edge with one edge of the meter, and standards on the card adapted to influence the probe to provide standard calibrating signals to the meter.

2. Calibration apparatus for a probe carrying instrument incorporating a meter deflected in accordance with indicating signals representative of a characteristic being tested by the probe comprising an indicia carrying card including a scale on one edge, means for removably juxtaposing the card edge with one edge of the meter, and standards on the card at least one of which is connected by an indicia line to the scale, said standards being adapted to influence the probe to provide standard calibrating signals to the meter.

3. Apparatus as defined in claim 2 in which the one edge of the card is formed by an arc of a circle having its center at the pivot of a pointer on the meter.

4. Calibration apparatus for a probe carrying instrument incorporating a meter deflected in accordance with indicating signals representative of a characteristic being tested by the probe comprising an indicia carrying card including a scale on one edge, means for removably juxtaposing the one card edge with one edge of the meter, at least one first standard on the card adapted to influence the probe to provide a first standard calibrating signal to the meter, and at least one second standard on the card adapted to influence the probe to provide a second standard calibrating signal to the meter.

5. Calibration apparatus for a probe carrying film thickness gauge incorporating a meter deflected in accordance with indicating signals representative of currents induced by the probe in metal surfaces comprising an indicia carrying card including a scale on one edge, means for removably juxtaposing the one card edge with one edge of the meter, a basis standard on the card adapted to influence the probe to provide a calibrating signal to the meter for setting it at a null point, and at least one film standard at least partially formed of metal on the card adapted to influence the probe to provide a film calibrating signal to the meter.

6. Apparatus as defined in claim 5 in which the one edge of the card is formed by an arc of a circle having its center at the pivot of a pointer on the meter.

7. In calibration apparatus for a probe carrying instrument incorporating a meter, a card having a contoured edge scale adapted to be juxtaposed with one edge of the meter, standards on the card adapted to influence the probe for calibrating the instrument, and indicia on the card correlating the standards and the edge scale.

8. Apparatus as defined in claim 7 in which the edge scale of the card is formed by an arc of a circle having its center at the pivot of a pointer on the meter.

References Cited in the file of this patent

UNITED STATES PATENTS

| | | |
|---|---|---|
| 2,665,333 | Dunipace et al. | Jan. 5, 1954 |
| 2,749,505 | McNary | June 5, 1956 |